US012736456B2

(12) United States Patent
Yamaguchi et al.

(10) Patent No.: US 12,736,456 B2
(45) Date of Patent: Sep. 15, 2026

(54) CENTRIFUGAL SEDIMENTATION-TYPE PARTICLE DIAMETER DISTRIBUTION MEASUREMENT DEVICE

(71) Applicants: HORIBA, Ltd., Kyoto (JP); EPPENDORF HIMAC TECHNOLOGIES CO., LTD., Hitachinaka-city (JP)

(72) Inventors: Tetsuji Yamaguchi, Kyoto (JP); Yuki Shimizu, Hitachinaka-city (JP); Ken Asakura, Hitachinaka-city (JP)

(73) Assignees: HORIBA, LTD., Kyoto (JP); EPPENDORF HIMAC TECHNOLOGIES CO., LTD., Hitachinaka-City (JP)

( * ) Notice: Subject to any disclaimer, the term of this patent is extended or adjusted under 35 U.S.C. 154(b) by 394 days.

(21) Appl. No.: 17/791,141

(22) PCT Filed: Dec. 4, 2020

(86) PCT No.: PCT/JP2020/045161
§ 371 (c)(1),
(2) Date: Jul. 6, 2022

(87) PCT Pub. No.: WO2021/140797
PCT Pub. Date: Jul. 15, 2021

(65) Prior Publication Data

US 2023/0049821 A1 Feb. 16, 2023

(30) Foreign Application Priority Data

Jan. 8, 2020 (JP) ................................ 2020-001365

(51) Int. Cl.
*G01N 15/04* (2006.01)
*G01N 15/0205* (2024.01)

(52) U.S. Cl.
CPC ....... *G01N 15/042* (2013.01); *G01N 15/0205* (2013.01); *G01N 2015/045* (2013.01)

(58) Field of Classification Search
None
See application file for complete search history.

(56) References Cited

U.S. PATENT DOCUMENTS 3,967,828 A * 7/1976 Topolski ................ G11B 17/30
4,742,718 A 5/1988 Jimbo
(Continued)

FOREIGN PATENT DOCUMENTS

GB 1533586 A 11/1978
JP S56-53895 Y2 12/1981
(Continued)

OTHER PUBLICATIONS

European Patent Office, Extended European Search Report dated Dec. 19, 2023 issued for European Patent Application No. 20912815.6 (10 pages).

(Continued)

*Primary Examiner* — Kara E. Geisel
*Assistant Examiner* — Chad Andrew Reverman
(74) *Attorney, Agent, or Firm* — LUCAS & MERCANTI, LLP

(57) ABSTRACT

The present invention includes: a cell holding body that holds a measurement cell housing a measurement sample and a dispersion medium; a cover attached to the cell holding body so as to cover the measurement cell; a rotation section that rotates the cell holding body and applies centrifugal force to the measurement cell; a light source that is provided on one side of a rotation passage region of the measurement cell and irradiates the cell with light; a photodetector that is provided on another side of the rotation passage region of the measurement cell and detects light (Continued)

transmitted through the cell; and a particle diameter distribution arithmetic section that acquires a light intensity signal from the photodetector and calculates a particle diameter distribution. The rotation passage region of the cover is located inside an optical path of light passing between the light source and the photodetector.

11 Claims, 4 Drawing Sheets

(56) References Cited

U.S. PATENT DOCUMENTS 5,208,791 A * 5/1993 Onishi .................. G11B 19/04 369/30.28
2003/0107960 A1* 6/2003 Omoto ................ G11B 17/225
2004/0016686 A1 1/2004 Wyatt
2007/0155017 A1* 7/2007 Wyatt ................ G01N 15/0255 436/45
2010/0282611 A1* 11/2010 Kim ...................... C12M 33/00 204/643
2017/0095814 A1* 4/2017 Boehm ............ G01N 35/00584

FOREIGN PATENT DOCUMENTS

JP S57-211042 A 12/1982
JP S62-111647 U 7/1987
JP H03-087636 A 4/1991
JP H05-006353 U 1/1993

OTHER PUBLICATIONS

Y. Togawa; Natural/Centrifugal Sedimentation-Type Particle Diameter Distribution Measurement Device CAPA-700; Readout, Horiba, Ltd.; Jan. 1992; No. 4; pp. 23-29 including English abstract.
International Search Report for the corresponding application No. PCT/JP2020/045161 dated Feb. 22, 2021, with English translation.

* cited by examiner 31h
311
312
72(7)
71(7)
33
321
311
31h
31

CENTRIFUGAL SEDIMENTATION-TYPE PARTICLE DIAMETER DISTRIBUTION MEASUREMENT DEVICE

CROSS REFERENCE TO RELATED APPLICATION

This Application is a 371 of PCT/JP2020/045161 filed on Dec. 4, 2020, which, in turn, claimed the priority of Japanese Patent Application No. 2020-001365 filed on Jan. 8, 2020, and both applications are incorporated herein by reference.

TECHNICAL FIELD

The present invention relates to a centrifugal sedimentation-type particle diameter distribution measurement device.

BACKGROUND ART

In a conventional centrifugal sedimentation-type particle diameter distribution measurement device as described in Non Patent Literature 1, a measurement cell housing a measurement sample and a dispersion medium is rotated and particles in the measurement sample are sedimentated in the dispersion medium to measure a particle diameter distribution of the measurement sample.

Here, the measurement cell is mounted on a rotary disk rotated by a motor, and a light source and a photodetector which are measurement optical systems are provided with the rotary disk interposed therebetween. The rotary disk is also provided with a reference cell housing only the dispersion medium. The reference cell also eliminates the influence of changes in the amount of light from the light source by correcting a measured amount of light transmitted through the measurement cell based on a reference amount of light transmitted through the reference cell.

In a centrifugal sedimentation-type particle diameter distribution measurement device as described in Patent Literature 1, a cover (holder cover) that covers a measurement cell and the like is provided on a surface of a rotary disk (disk body) to which the measurement cell and the like are attached in order to reduce the influence of windage loss. A light passage aperture is formed in the cover so as not to block light from a light source to a photodetector.

CITATION LIST

Non Patent Literature

Non Patent Literature 1: TOGAWA, Yoshiaki. "Natural/Centrifugal Sedimentation-Type Particle Diameter Distribution Measurement Device CAPA-700", Readout, HORIBA, Ltd., January 1992, No. 4, pp. 23-29

PATENT LITERATURE

Patent Literature 1: JP H05-6353 U

SUMMARY OF INVENTION

Technical Problem

However, when exchanging cells or the like, it is necessary to attach the cover to the rotary disk while aligning the light passage aperture of the cover with the measurement cell attached to the rotary disk after attaching the measurement cell or the like to the rotary disk. In this way, the work of attaching the rotary disk while aligning the cover becomes complicated.

Therefore, the present invention has been made to solve the above problem, and a main object thereof is to facilitate attachment work of a cover to a cell holding body when exchanging cells or the like.

Solution to Problem

A centrifugal sedimentation-type particle diameter distribution measurement device according to the present invention includes: a cell holding body that holds a measurement cell housing a measurement sample and a dispersion medium; a cover attached to the cell holding body so as to cover the measurement cell; a rotation section that rotates the cell holding body and applies centrifugal force to the measurement cell; a light source that is provided on one side of a rotation passage region of the measurement cell and irradiates the cell with light; a photodetector that is provided on another side of the rotation passage region of the measurement cell and detects light transmitted through the cell; and a particle diameter distribution arithmetic section that acquires a light intensity signal from the photodetector and calculates a particle diameter distribution. The rotation passage region of the cover is located inside an optical path of light passing between the light source and the photodetector.

According to this configuration, since the rotation passage region of the cover is located inside the optical path of the light passing between the light source and the photodetector, it is not necessary to form a passage aperture that allows light to pass through the cover, and alignment of passage apertures as in the related art becomes unnecessary. As a result, work of attaching the cover to the cell holding body when exchanging cells or the like can be facilitated.

As a specific embodiment for reducing windage loss, it is desirable that the cell holding body have a circular shape in plan view, a center thereof serve as a rotation center of the rotation section, and the cover have a circular shape in plan view and be attached concentrically to the cell holding body.

In order to maintain balance of the cell holding body during rotation and eliminate the influence of a change in the amount of light from the light source, it is desirable that the cell holding body hold the measurement cell and a reference cell housing a reference sample such that the rotation center of the cell holding body is interposed between the measurement cell and the reference cell.

In this case, in order to reduce not only the windage loss caused by the measurement cell but also the windage loss caused by the reference cell, it is desirable that the cover cover the measurement cell and the reference cell.

As a specific embodiment of the cell holding body, it is desirable that a cell concave part that houses the measurement cell and a cover concave part that houses the cover be formed on one surface of the cell holding body. According to this configuration, by attaching the cover to the cell holding body, the cell concave part is covered by the cover and unevenness in the upper surface of the cell holding body can be reduced, thus reducing windage loss and noise due to unevenness.

In order to prevent breakage of the measurement cell due to rotation, it is desirable to further include a cell protecting member that is interposed between the cell holding body and the measurement cell and disperses centrifugal force applied to the measurement cell to prevent breakage of the measurement cell.

In addition, although the centrifugal load applied to the measurement cell is transmitted to the cell holding body via the cell protecting member, stress generated in the cell holding body can be reduced by employing a structure in which the cell protecting member and the cell holding body make surface contact with each other.

Here, in order to enlarge the portion of the measurement cell protected by the cell protecting member and not to interfere with measurement, it is desirable that a light transmission portion be formed in the cell protecting member through which light is transmitted from the light source to the photodetector.

Since the cell protecting member is configured to be detachable from the cell holding body, rattling occurs between the cell protecting member and the cell holding body. By contrast, the light passage portion of the cell protecting member is formed such that the light passing between the light source and the photodetector passes therethrough while the cell holding body is rotating. Here, in a case in which the cover is provided in contact with the cell protecting member, the cell protecting member is fixed by the cover and the light passage portion of the cell protecting member is in a wrong position while the cell holding body is rotating. In order to suitably solve this problem, it is desirable that the cover cover the cell protecting member with a gap in a rotation axial direction of the cell holding body. According to this configuration, since the cell protecting member is not fixed to the cover, the light passage portion of the cell protecting member can be at a desired position while the cell holding body is rotating, and light can be reliably passed through the light passage portion of the cell protecting member.

Advantageous Effects of Invention

According to the present invention as described above, work of attaching the cover to the cell holding body when exchanging cells or the like can be facilitated.

REFERENCE SIGNS LIST

- 100 centrifugal sedimentation-type particle diameter distribution measurement device
- 2 measurement cell
- 31 cell holding body
- 311 cell concave part
- 312 cover concave part
- 33 cover
- 34 cell protecting member
- **34*h*1** light passage aperture
- **34*h*2** light passage aperture
- 41 light source
- 51 photodetector
- 6 reference cell

DESCRIPTION OF EMBODIMENTS

The following describes a centrifugal sedimentation-type particle diameter distribution measurement device according to an embodiment of the present invention with reference to the accompanying drawings.

Figure 1:
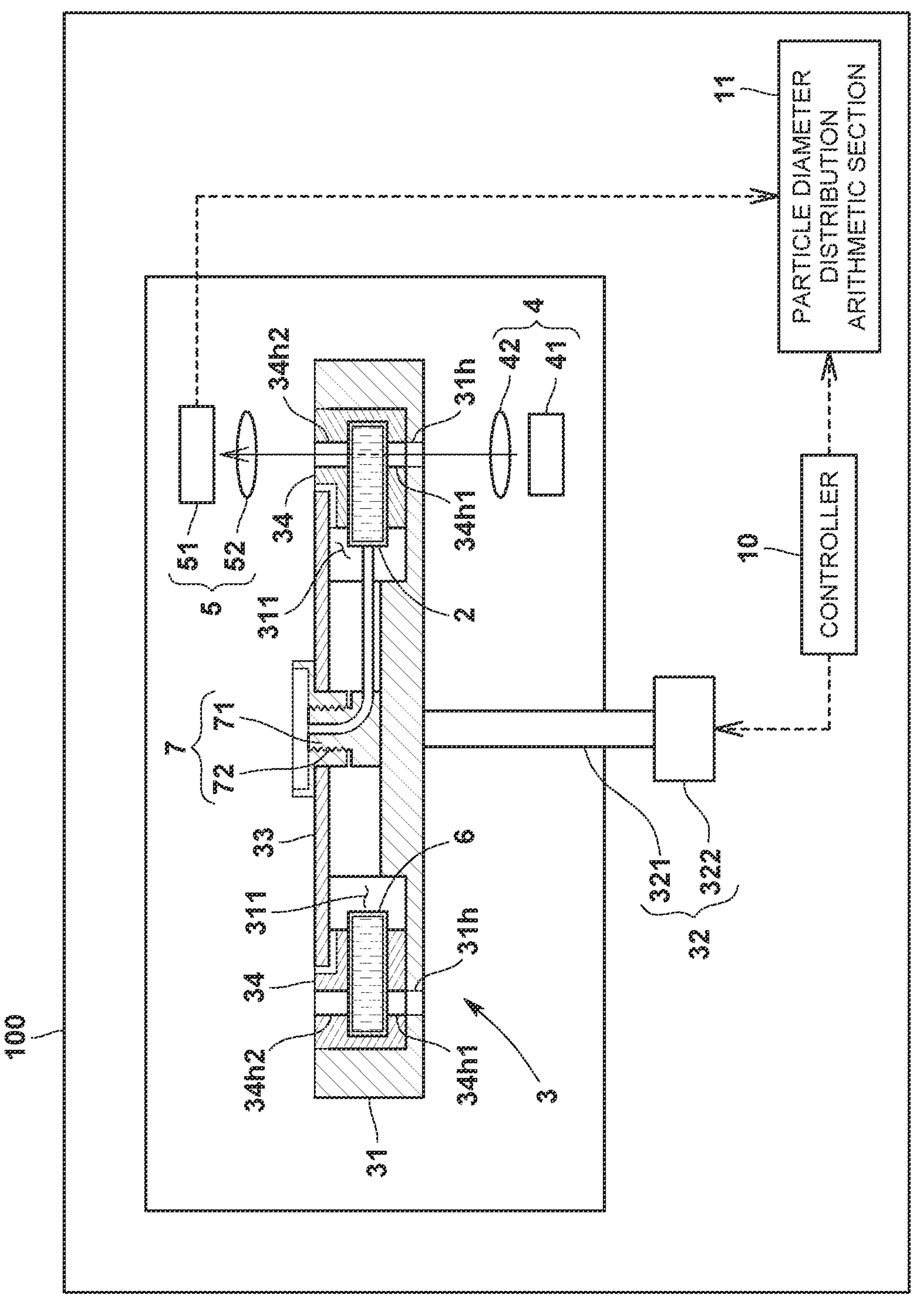
FIG. 1 is a diagram schematically illustrating a configuration of a centrifugal sedimentation-type particle diameter distribution measurement device according to an embodiment of the present invention.

As illustrated in FIG. 1, a centrifugal sedimentation-type particle diameter distribution measurement device 100 of the present embodiment includes a measurement cell 2 that houses a sample suspension containing a measurement sample and a dispersion medium (e.g., water), a cell rotation mechanism 3 that rotates the measurement cell 2, and a light irradiation section 4 and a light detection section 5 that are optical measurement systems between which a rotation passage region is provided in which the measurement cell 2 is rotated by the cell rotation mechanism 3. The rotation passage region is an annular region through which the measurement cell 2 passes due to the cell rotation mechanism 3, and is provided as partially interposed between the light irradiation section 4 and the light detection section 5 in a circumferential direction.

The measurement cell 2 is, for example, a rectangular cell formed from a translucent resin material. A reference cell 6 is also provided in the present embodiment, and water is housed as a dispersion medium in the reference cell 6.

The cell rotation mechanism 3 includes a cell holding body 31 to which the measurement cell 2 and the reference cell 6 are detachably attached, and a rotation section 32 that rotates the cell holding body 31.

The cell holding body 31 is circular in plan view (refer to FIG. 2), and the center thereof is the center of rotation by the rotation section 32. In the present embodiment, the cell holding body 31 is disk-shaped. The measurement cell 2 and the reference cell 6 are attached to the cell holding body 31 such that the center of rotation of the cell holding body 31 is interposed therebetween. In addition, as particularly illustrated in FIG. 3, an attachment concave part 311 corresponding to a cell shape is formed in the cell holding body 31, and the cells 2 and 6 are attached by being fitted into the attachment concave part 311. The cell holding body 31 is made of metal.

As illustrated in FIG. 1 and the like, a cover 33 for preventing the measurement cell 2 and the reference cell 6 from being unexpectedly detached during rotation is provided on the upper surface of the cell holding body 31. The cover 33 is circular in plan view (refer to FIG. 2), and is concentrically attached to the cell holding body 31. The cover 33 of the present embodiment is disk-shaped.

The cover 33 is fixed to the cell holding body 31 by a screw structure 7. The screw structure includes a male screw portion 71 provided at the center of one of the cell holding body 31 and the cover 33 and a female screw portion 72 provided at the center of the other of the cell holding body 31 and the cover 33. The cover 33 is then fixed to the cell holding body 31 by screwing the female screw portion 72 into the male screw portion 71.

Furthermore, a cell protecting member 34 is provided in the cell holding body 31. The cell protecting member 34 is interposed between the holder 31 and the cells 2 and 6, and receives and disperses centrifugal force applied to the cells 2 and 6 to prevent breakage of the cells 2 and 6. The cell protecting member 34 is made of the same resin as the measurement cell 2, for example. The cell protecting member 34 can be removed from the cell holding body 31 together with the cells 2 and 6.

As illustrated in FIG. 1, the rotation section 32 includes a rotating shaft 321 connected to the center of the lower surface of the cell holding body 31, and a motor 322 that rotates the rotating shaft 321. The rotation speed of the motor 322 is controlled by a controller 10. The rotating shaft 321 may be integrated with the cell holding body 31 or may be formed separately. Also, the rotating shaft 321 may be formed as one member or may be formed by connecting a plurality of members.

As illustrated in FIG. 1, the light irradiation section 4 is provided below the rotation passage region (cell holding body 31) of the cells 2 and 6. The light irradiation section 4 of the present embodiment includes a light source 41 such as an LED, for example, and a condenser lens 42 that condenses light emitted from the light source 41. Light emitted by the light irradiation section 4 passes through a light passage aperture 31*h* formed in the cell holding body 31 and a light passage aperture 34*h*1 formed in the cell protecting member 34, and is irradiated into the measurement cell 2 or the reference cell 6. The light passage apertures 34*h*1 and 34*h*2 of the cell protecting member 34 are formed so as to coincide with the light passage aperture 31*h* of the cell holding body 31 (the central axes thereof coincide with each other) in a state in which the cell holding body 31 rotates and the cell protecting member 34 receives centrifugal force.

As illustrated in FIG. 1, the light detection section 5 is provided above the rotation passage region (cell holding body 31) of the cells 2 and 6. The light detection section 5 of the present embodiment includes a photodetector 51 and a condenser lens 52 that condenses light detected by the photodetector 51. The light detected by the light detection section 5 passes through the cells 2 and 6, passes through the light passage aperture 34*h*2 formed in the cell protecting member 34, and is condensed by the condenser lens 52.

A light intensity signal obtained by the photodetector 51 is acquired by a particle diameter distribution arithmetic section 11, and particle diameter distribution data is calculated by the particle diameter distribution arithmetic section 11. The particle diameter distribution arithmetic section 11 converts the light intensity signal into an absorbance, and calculates the particle diameter distribution data from this temporal change. The particle diameter distribution data is displayed on a display by an unillustrated display section. The particle diameter distribution arithmetic section 11 includes the controller 10 and a computer with elements such as a central processing unit (CPU), memory, an input/output interface, and an analog-to-digital (AD) converter.

Figure 2:
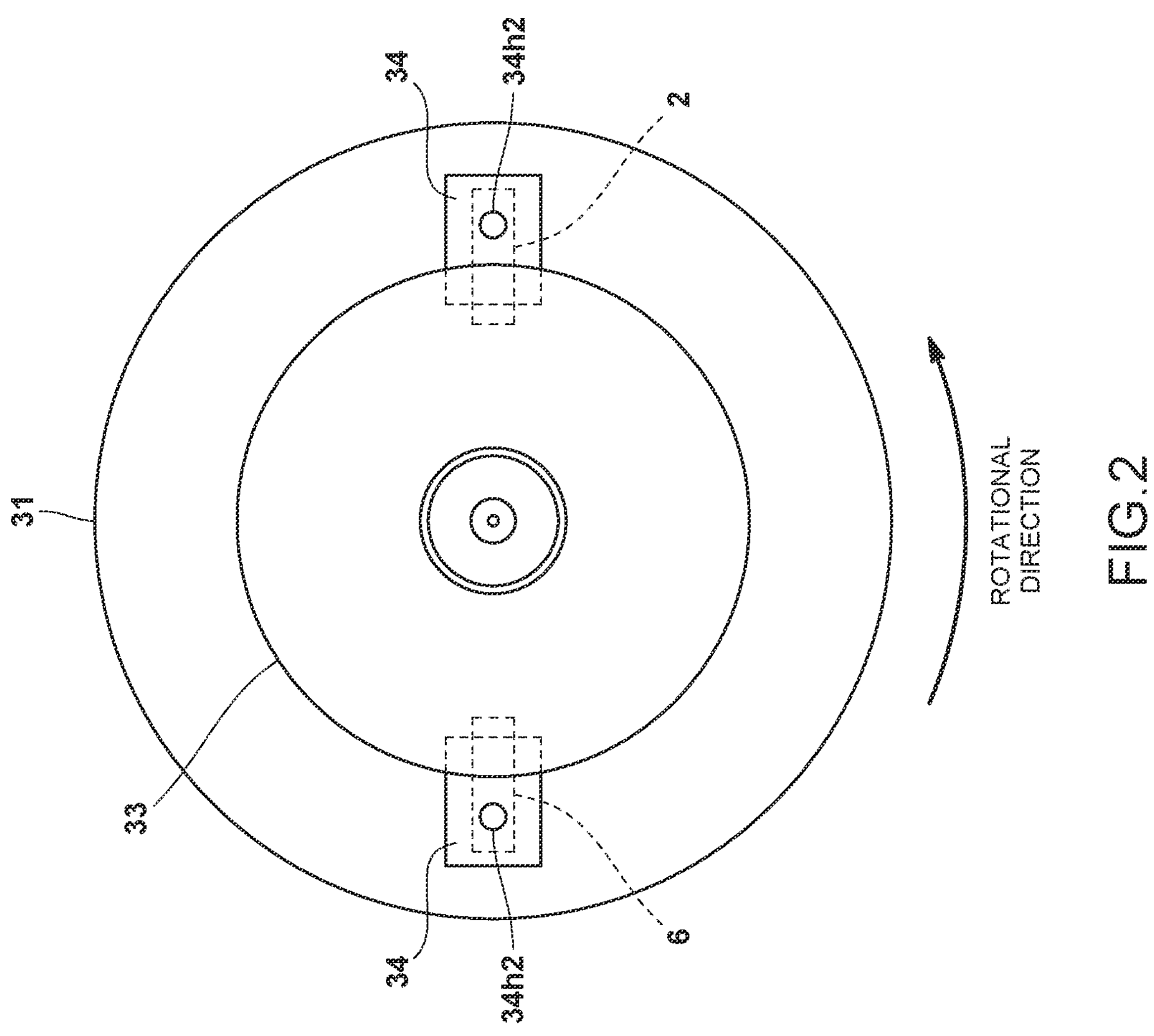
FIG. 2 is a plan view of a cell holding body to which a cover of the embodiment is attached.
Figure 4:
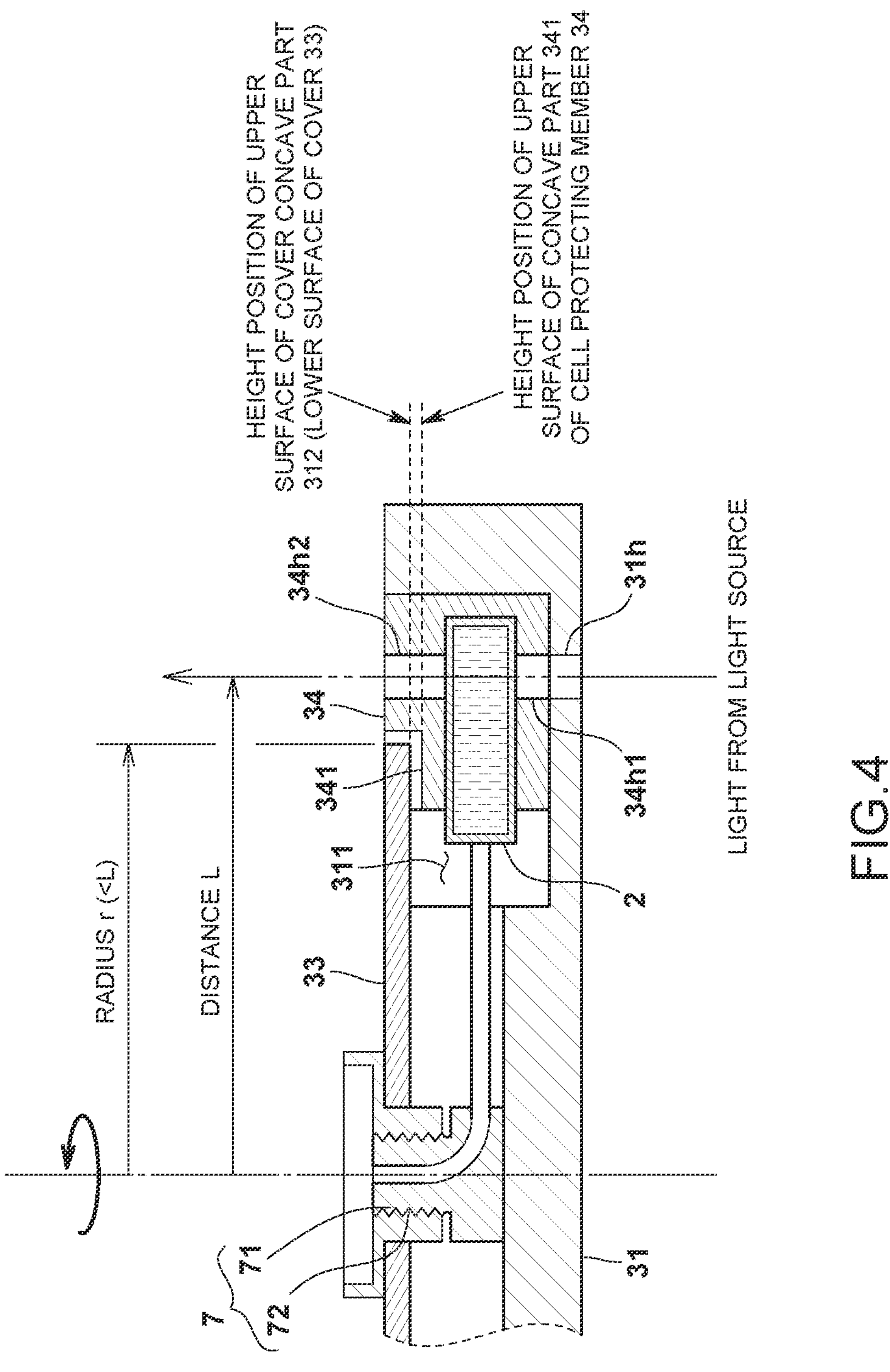
FIG. 4 is a cross-sectional view of a positional relationship between the cover and an optical path of the embodiment.

Finally, in the centrifugal sedimentation-type particle diameter distribution measurement device 100 of the present embodiment as illustrated in FIGS. 2 and 4, the rotation passage region of the cover 33 is located inside the optical path of light passing between the light source 41 and the photodetector 51.

Specifically, as illustrated in FIG. 4, a radius r of the cover 33 (distance from the rotation center of the rotation section 32 to the outer peripheral edge of the cover 33) is configured to be smaller than a distance L from the rotation center of the rotation section 32 to the optical path of the light. Through this configuration, the cover 33 does not have a passage aperture through which light passes.

The cover 33 prevents the cells 2 and 6 from flying out of the cell holding body 31, and is configured to partially cover the inner radial side of the measurement cell 2 and the reference cell 6 in a state of attachment to the cell holding body 31. In the present embodiment, the cover 33 is configured to also partially cover the cell protecting member 34 that protects the cells 2 and 6 so as not to block the light passage aperture 34*h*2 formed in the cell protecting member 34. As a result, the cover 33 also prevents the cell protecting member 34 from flying out of the cell holding body 31. In addition, the cover 33 has a shape that covers the cell concave part 311 in a state of attachment to the cell holding body 31, and can reduce unevenness in the upper surface of the cell holding body 31, thereby reducing windage loss and noise due to unevenness during rotation.

Figure 3:
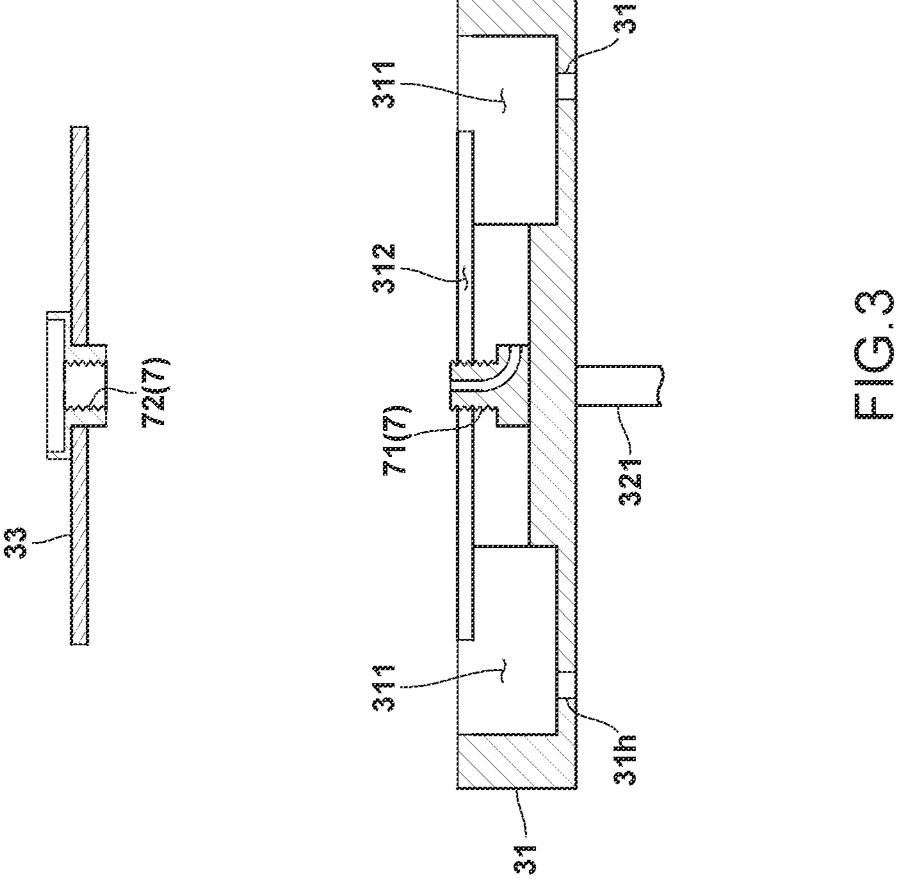
FIG. 3 is a cross-sectional view of the cell holding body and the cover of the embodiment.

As illustrated in FIG. 3, a cover concave part 312 for housing the cover 33 is formed in the upper surface of the cell holding body 31 in addition to the attachment concave part 311 (cell concave part 311). The cover concave part 312 is formed coaxially with the rotation center of the rotation section 32. Through the above, the cover 33 can be easily positioned on the cell holding body 31. The depth of the cover concave part 312 is a depth at which a step between the upper surface of the cover 33 and the upper surface of the cell holding body 31 is small. In the present embodiment as illustrated in FIG. 4, since the cover 33 is configured to partially cover the cell protecting member 34, a concave part 341 is also formed in the cell protecting member 34 so as not to make contact with the cover 33. Since the cell protecting member 34 is configured not to make contact with the cover 33, the cell protecting member 34 moves radially outward when receiving centrifugal force during rotation of the cell holding body, and the light passage apertures 34*h*1 and 34*h*2 of the cell protecting member 34 and the light passage aperture 31*h* of the cell holding body 31 coincide with each other. Specifically, the cover 33 covers the cell protecting member 34 with a gap in a rotation axial direction of the cell holding body 31. The gap in the rotation axial direction is formed due to the upper surface of the cover concave part 312 that makes contact with the lower surface of the cover 33 being configured to be higher than the upper surface of the concave part 341 of the cell protecting member 34 attached to the attachment concave part 311. That is, the gap in the rotation axial direction is formed between the lower surface of the cover 33 and the upper surface of the concave part 341 of the cell protecting member 34. In addition, since the cell protecting member 34 moves radially outward from the cell holding body 31 when receiving centrifugal force, a gap also opens in a radial direction between the outer peripheral surface of the cover 33 and the inner surface of the concave part 341 of the cell protecting member 34. Although the centrifugal load applied to the measurement cell 2 is transmitted to the cell holding body 31 via the cell protecting member 34, stress generated in the cell holding body 31 can be reduced by employing a structure in which the cell protecting member 34 and the cell holding body 31 make surface contact with each other.

Effects of Present Embodiment

According to the centrifugal sedimentation-type particle diameter distribution measurement device 100 of the present embodiment, since the rotation passage region of the cover 33 is located inside the optical path of the light passing between the light source 41 and the photodetector 51, it is not necessary to form a passage aperture that allows light to pass through the cover 33, and alignment of passage apertures as in the related art becomes unnecessary. As a result, work of attaching the cover 33 to the cell holding body 31 when exchanging cells or the like can be facilitated. In the present embodiment, the cover 33 can be attached by simply screwing the female screw portion of the cover 33 into the male screw portion of the cell holding body 31 without worrying about the attachment position of the cover 33 in the circumferential direction with respect to the cell holding body 31.

Other Variant Embodiments

It should be noted that the present invention is not limited to the above embodiment.

For example, the cover 33 of the above embodiment need not have a circular shape in plan view as long as unevenness of the upper surface of the cell holding body 31 is reduced to reduce windage loss. Even in this case, the rotation passage region of the cover 33 is configured to be located inside the optical path of the light passing between the light source 41 and the photodetector 51.

Furthermore, although the light passage apertures **34*h*1 and 34*h*2 are formed in the cell protecting member 34, it is conceivable for the cell protecting member 34 to be configured to protect portions of the cells 2 and 6 excluding light passage portions without forming a light passage aperture in the cell protecting member 34**, for example.

In the above embodiment, the measurement cell 2 is irradiated with light and transmitted light is detected. However, when an isotope sample or a self-luminous sample is housed in the measurement cell 2, the light irradiation section may not be provided. In this case, the rotation passage region of the cover 33 is configured to be located inside the optical path of the light from the measurement cell 2 to the photodetector 51.

In addition, various modifications and combinations of the embodiment may be made without departing from the gist of the present invention.

INDUSTRIAL APPLICABILITY

According to the present invention, a centrifugal sedimentation-type particle diameter distribution measurement device can be provided which facilitates work of attaching a cover to a cell holding body when exchanging cells or the like.

The invention claimed is:

1. A centrifugal sedimentation-type particle diameter distribution measurement device comprising:

a cell holding body configured to hold a measurement cell housing a measurement sample and a dispersion medium;

a cell protecting member interposed between the cell holding body and the measurement cell and configured to disperse centrifugal force applied to the measurement cell to prevent breakage of the measurement cell, the cell protecting member having a concave part;

a cover attached to the cell holding body so as to cover the at least a portion of the concave part of the cell protecting member and prevent the measurement cell from being detached from the cell holding body;

a rotation section configured to rotate the cell holding body and apply centrifugal force to the measurement cell, wherein the cell protecting member is configured to not contact the cover and move radially outward when receiving the centrifugal force during rotation of the cell holding body;

a light source provided on one side of a rotation passage region of the measurement cell and configured to irradiate the cell with light;

a photodetector provided on another side of the rotation passage region of the measurement cell and configured to detect light transmitted through the cell; and a particle diameter distribution arithmetic section configured to acquire a light intensity signal from the photodetector and calculate a particle diameter distribution, wherein a distance from a rotation center of the rotation section to an outer peripheral edge of the cover is configured to be smaller than a distance from the rotation center of the rotation section to the optical path of the light.

2. The centrifugal sedimentation-type particle diameter distribution measurement device according to claim 1, wherein, the cell holding body has a circular shape in plan view, and a center thereof serves as a rotation center of the rotation section, and the cover has a circular shape in plan view, and is attached concentrically to the cell holding body.

3. The centrifugal sedimentation-type particle diameter distribution measurement device according to claim 2, wherein the cell holding body holds the measurement cell and a reference cell housing a reference sample such that a rotation center of the cell holding body is interposed between the measurement cell and the reference cell, and the cover covers the measurement cell and the reference cell.

4. The centrifugal sedimentation-type particle diameter distribution measurement device according to claim 1, wherein a cell concave part that houses the measurement cell and a cover concave part that houses the cover are formed on one surface of the cell holding body, the cover concave part and the cell concave part are formed in different areas on the one surface.

5. The centrifugal sedimentation-type particle diameter distribution measurement device according to claim 1, wherein a light transmission portion is formed in the cell protecting member through which light is transmitted from the light source to the photodetector.

6. The centrifugal sedimentation-type particle diameter distribution measurement device according to claim 1, wherein the cover covers the cell protecting member with a gap in a rotation axial direction of the cell holding body.

7. The centrifugal sedimentation-type particle diameter distribution measurement device according to claim 1, wherein the cover is disk-shaped.

8. The centrifugal sedimentation-type particle diameter distribution measurement device according to claim 1, wherein a cell concave part that houses the measurement cell is formed on one surface of the cell holding body, and the cover is configured to partially cover measurement cell in the cell concave part.

9. The centrifugal sedimentation-type particle diameter distribution measurement device according to claim 1, wherein the cover is attached by a fastener and the cover is removable from the cell holding body when the fastener is released to allow the measurement cell to be removed from the cell holding body.

10. The centrifugal sedimentation-type particle diameter distribution measurement device according to claim 2, wherein a cell concave part that houses the measurement cell is formed on one surface of the cell holding body and has a radially inner end and a radially outer end, the outer peripheral edge of the cover is disposed between the radially inner end and the radially outer end of the cell holding body.

11. The centrifugal sedimentation-type particle diameter distribution measurement device according to claim 4, wherein an upper part of the cover concave part contacts a lower surface of the cover and the cover is configured to cover the cell protecting member with a gap in the rotational axial direction between the lower surface of the cover and an upper surface of the concave part of the cell protecting member.

* * * * *